United States Patent Office 3,839,351
Patented Oct. 1, 1974

3,839,351
TRIAZOLYL-COUMARINS
Alfons Dorlars, Leverkusen, and Heinrich Gold, Cologne, Germany, assignors to Bayer Aktiengesellschaft, Leverkusen, Germany
No Drawing. Filed Aug. 13, 1971, Ser. No. 171,758
Claims priority, application Germany, Aug. 13, 1970, P 20 40 189.2
Int. Cl. C07d 55/02
U.S. Cl. 260—308 A    3 Claims

ABSTRACT OF THE DISCLOSURE

Coumarin compounds of the formula

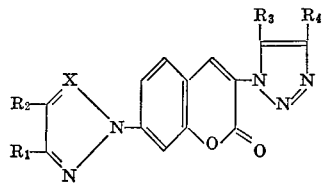

in which $R_1$, $R_2$, $R_3$ and $R_4$ mean hydrogen, alkyl or aryl radicals;
$R_1$ and $R_2$ as well as $R_3$ and $R_4$, together with the two carbon atoms of the respective heterocycle, may form a non-aromatic ring system;
$R_2$ may also stand for a cyano, carboxyl, carboxylic acid ester or carboxylic acid amide group;
X stands for a nitrogen atom or a methine group (CH); and the coumarin ring as well as the alkyl and aryl radicals may contain further substituents, and their quaternisation products of the formula

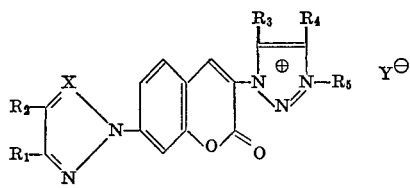

in which $R_1$ to $R_4$ and X have the same meaning as above, $R_5$ stands for an alkyl radical; and Y represents a colourless anion as well as their preparation and their use as optical brighteners.

---

The subject-matter of the present invention comprises coumarin compounds of the formula

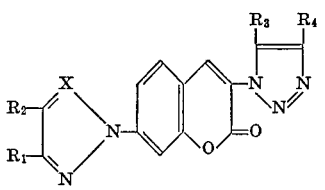

in which $R_1$, $R_2$, $R_3$ and $R_4$ mean hydrogen, alkyl or aryl radicals;
$R_1$ and $R_2$ as well as $R_3$ and $R_4$, together with the two carbon atoms of the respective heterocycle, may form a non-aromatic ring system;
$R_2$ may also stand for a cyano, carboxyl, carboxylic acid ester or carboxylic acid amide group;
X stands for a nitrogen atom or a methine group (CH); and the coumarin ring as well as the alkyl and aryl radicals may contain further substituents, and their quaternisation products of the formula

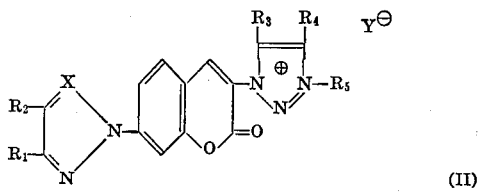

in which $R_1$ to $R_4$ and X have the same meaning as above; $R_5$ stands for an alkyl radical; and Y represents a colourless anion, as well as their production and their use as brightening agents.

The alkyl radicals $R_1$–$R_5$ comprise straight-chain, branched or cyclic, saturated or unsaturated alkyl groups with 1–12 carbon atoms, which may contain substituents, for example, halogen atoms, e.g. fluorine, chlorine and bromine; hydroxyl groups; alkoxy groups with 1–4 carbon atoms; alkyl-carbonyloxy groups with 1–4 carbon atoms in the alkyl radical; cyano; carboxylic acid groups; alkoxycarbonyl groups with 1–4 carbon atoms in the alkyl group; as well as phenyl radicals which may contain halogen atoms, $C_1$–$C_4$-alkyl and alkoxy groups.

Suitable alkyl radicals are, for example: methyl, hydroxymethyl, methoxymethyl, cyanomethyl, ethoxycarbonylmethyl, ethyl, β-hydroxyethyl, β-acetoxyethyl, β-chloroethyl, β-cyanoethyl, carboxyethyl, ethoxycarbonylethyl, methoxyethyl, ethoxyethyl, n- and iso-propyl, n-iso-, sec.- and tert.-butyl, iso-butenyl, pentyl, hexyl, octyl, decyl, dodecyl, benzyl, p-chlorobenzyl, β-phenylethyl, β-methoxyethenyl and cyclohexyl radicals.

The optionally substituted aryl radicals primarily comprise phenyl radicals which may carry one or more substituents, for example, fluorine, chlorine, bromine, cyano, lower alkyl and alkoxy groups with 1–4 carbon atoms (which, in turn, may be further substituted, e.g. by phenyl radicals), the carboxyl group, alkoxy-carbonyl groups with 2–5 carbon atoms, sulphonic acid groups, sulphonic acid ester groups, optionally alkyl-substituted sulphonamide groups, alkylsuphone groups with 1–4 carbon atoms, phenyl and phenoxy radicals.

The following are examples of such radicals: phenyl, o-, m- and p-fluorophenyl, o-, m- and p-chlorophenyl, o-, m- and p-bromophenyl, o-, m- and p-tolyl, o-, m- and p-anisyl, m- and p-cyanophenyl, m- and p-ethoxycarbonylphenyl, suphophenyl-, amidosulphonylphenyl, phenoxysulphonylphenyl, m- and p-methylsulphonylphenyl, m- and p-ethylsulphonylphenyl, p-benzylphenyl, p-benzyloxyphenyl radicals, p-biphenyl and p-phenoxyphenyl radicals.

Non-aromatic ring systems which are fused with the v-triazole ring and may also be symbolised by $R_1$ and $R_2$ together with the two carbon atoms of the v-triazole ring, are, in particular, cyclopentane and cyclohexane rings which, in turn, may be fused with a benzene ring. Examples of such fused systems are the following:

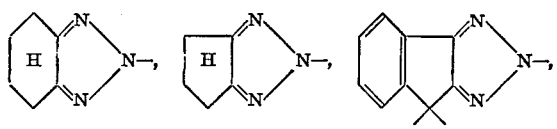

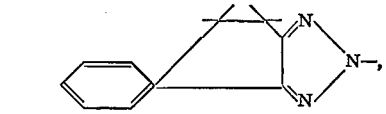

Suitable carboxylic acid ester groups $R_2$ are, for example, alkoxy-carbonyl groups with 1–4 carbon atoms in the alkoxy group, such as methoxy-carbonyl, ethoxy-carbonyl or butoxy-carbonyl radicals.

An optionally substituted carboxylic acid imide group is, for example, a carboxylic acid amide group which may be mono- or disubstituted by alkyl radicals with 1-4 carbon atoms. Examples are the groups —CONH$_2$, —CONHCH$_3$, —CONHC$_4$H$_9$, —CON(CH$_3$)$_2$ and —CON(C$_2$H$_5$)$_2$.

Suitable substituents in the coumarin ring are primarily C$_1$–C$_4$-alkyl radicals.

The anion Y is preferably a colourless anion which either originates from the quaternising agent used, or has been introduced by exchange of the anion initially present. Suitable anions are, for example, Cl, Br, I; sulphonate groups such as CH$_3$O-SO$_3$, C$_2$H$_5$O-SO$_3$; benzenesulphonate, toluene-sulphonate, phosphate, formate, acetate, chlorozincate, perchlorate, nitrate, sulphate and oxalate radicals.

Preferred coumarin compounds with the scope of the formula (I) are those of the formula

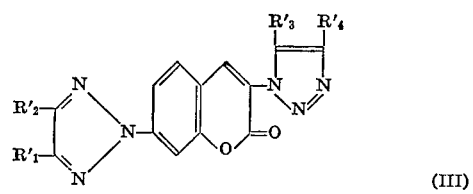

(III)

in which

R'$_1$ and R'$_2$ means hydrogen; C$_1$–C$_{10}$-alkyl groups which may be substituted by chlorine, fluorine, bromine, hydroxyl, C$_1$–C$_4$-alkoxy, C$_2$–C$_5$-alkyl-carbonyloxy, C$_2$–C$_5$-alkoxy-carbonyl, cyano, carboxyl and phenyl radicals; a cyclohexyl radical; or phenyl groups which may be substituted by fluorine, chlorine, bromine, cyano, C$_1$–C$_4$-alkyl, C$_1$–C$_4$-alkoxy, benzyl or C$_2$–C$_5$-alkoxy-carbonyl groups;

R'$_1$ and R'$_2$ together may stand for —(CH$_2$)$_4$ or

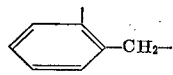

and

R'$_3$ and R'$_4$ stand for hydrogen, C$_1$–C$_4$-alkyl, methoxymethyl, phenyl, or together stand for —(CH$_2$)$_4$—, as well as their quaternisation products of the formula

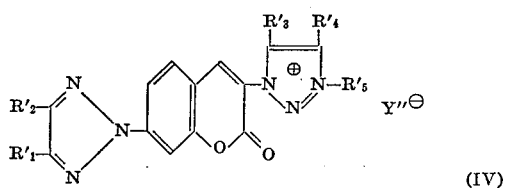

(IV)

in which

R'$_1$ and R'$_4$ have the same meaning as above;

R'$_5$ stands for a C$_1$–C$_4$-alkyl group which may be substituted by hydroxyl, halogen, C$_1$–C$_4$-alkoxy, C$_2$–C$_5$-alkoxy-carbonyl, cyano or by phenyl radicals; and Y" represents a colourless anion.

The new coumarin compounds of the formula (I) and their quaternary salts of the formula (II) can be prepared according ot various processes.

Those compounds of the formula (I) in which X represents a nitrogen atom; R$_1$, R$_2$, R$_3$ and R$_4$ mean hydrogen, alkyl or aryl radicals; and R$_1$ and R$_2$ as well as R$_3$ and R$_4$, together with the two carbon atoms of the respective v-triazole ring, may form a non-aromatic ring system, are obtained in that compounds of the formula

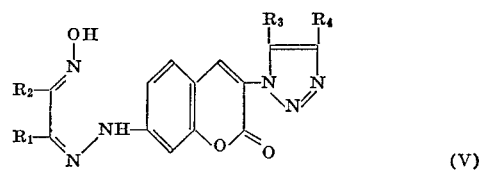

(V)

in which R$_1$ to R$_4$ have the same meaning as above, are either directly triazolised by treatment with dehydrating agents, or are first converted by reaction with dehydrating agents into the corresponding triazole-N-oxides of the formula

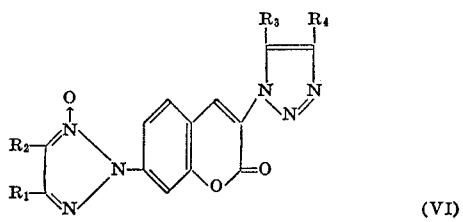

(VI)

in which R$_1$ to R$_4$ have the same meaning as above, and the latter are subsequently reduced.

The dehydration of the coumarin compounds (V) is carried out in known manner by heating with dehydrating agents such as acid anhydrides and acid halides.

Examples are: acetic anhydride, propionic acid anhydride, acetyl chloride, thionyl chloride, sulphuryl chloride and phosphorus pentoxide; the acetic anhydride is particularly suitable and is used either in ample excess or in combination with solvents.

Suitable solvents are dimethyl sulphoxide, dimethyl formamide, N-methyl-pyrrolidone, tetramethyl urea, acetic acid, propionic acid, and others. In most cases, an addition of bases is expedient, such as lithium, sodium or potassium acetate, trimethylamine, triethyl amine, dimethyl-benzylamine, pyridine and higher pyridine homologues.

The temperatures at which the dehydration is carried out may be varied within a fairly wide range. In general, the process is carried out at temperatures of between 40 and 160° C., preferably at between 60 and 140° C.

The cyclisation of the compounds (V) in the presence of dehydrating agents to form the triazole-N-oxides of the formula (VI) is expediently carried out in solvents which are inert under the reaction conditions applied and towards the chosen oxidising agents, such as e.g. pyridine, higher pyridine bases, dimethyl formamide, N-methyl-pyrrolidone, dimethyl sulphoxide, acetic acid and their mixtures with water.

Suitable dehydrating agents are, inter alia, mercury(II) oxide, copper(II) salts such as copper acetate and copper sulphate, complex copper(II) salts, lead dioxide, lead tetra-acetate, sodium and potassium bichromate, potassium ferricyanide, hydrogen peroxide, aceto peracid and potassium peroxy-disulphate.

A technically preferred method of carrying out the process consists in dehydrating compounds of the formula (V) in the presence of pyridine or technical pyridine bases with copper(II) salts, such as copper acetate or copper sulphate, which may be used in solid form or in aqueous solution; the blowing in of air may be expedient.

This oxidative cyclisation is generally carried out at temperatures of about 0° C. to 100° C., preferably of 20 to 80° C.

The subsequent reduction of the triazole-N-oxides (VI) can be carried out, for example, with the aid of zinc dust and zinc amalgam in an acetic acid or mineral acid solution or suspension, or by means of tin granulate or tin(II) chloride in mineral acids.

The coumarin compounds of the formula (V) required as starting substances can be prepared in known manner by condensing 4-acetamino-2-hydroxybenzaldehyde or its anil with triazolyl-acetic acids of the formula

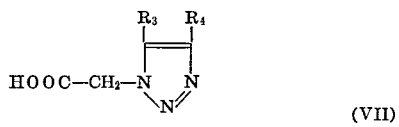
(VII)

in which $R_3$ and $R_4$ have the same meaning as above, to form 7-acetamino-3-[1,2,3-triazolyl-(1)]-coumarins; subsequently hydrolysing the acetamino group to form the amino group; converting the resultant 7-amino-coumarins by diazotisation and subsequent reduction into the corresponding 7-hydrazino-coumarins; and, finally, condensing the latter, again in known manner, with α-oximino-ketones of the formula

(VIII)

to form the oximino-hydrazones of the formula (V).

Some of the triazolyl-acetic acids (VII) are known. They are obtained in known manner by reacting azido-acetic esters wtih acetylenes and subsequent alkaline hydrolysis of the ester group.

Suitable triazolyl-acetic acids of the formula (VII) are, for example, 1,2,3-triazolyl-(1)-acetic acid,
4-phenyl-v-triazolyl-(1)-acetic acid,
4-phenyl-5-methyl-v-triazolyl-(1)-acetic acid,
4,5-bis-hydroxymethyl-v-triazolyl-(1)-acetic acid,
4,5-bis-methoxymethyl-v-triazolyl-(1)-acetic acid,
4-methoxymethyl-v-triazolyl-(1)-acetic acid,
4-methyl-v-triazolyl-(1)-acetic acid,
4-methoxyvinyl-v-triazolyl-(1)-acetic acid,
4,5,6,7-tetrahydrobenzotriazolyl-(1)-acetic acid.

Suitable α-oximino-ketones of the formula (VIII) are *inter alia*, 1-oximino-3,3-dimethylbutanone-2,
oximino-acetone,
diacetyl-monoxime,
1-oximino-butanone-(2),
2-oximino-1-phenyl-butanone-(3),
1,3-diphenyl-1-oximino-propanone-(2),
oximino-benzyl-cyclohexyl-ketone,
1-oximino-4-phenyl-buten-(3)-one-(2),
2-oximino-pentanone-(3),
3-oximino-4-methyl-pentanone-(2),
1-oximino-4-methylpenten-(3)-one-(2),
3-oximino-pentanol-(5)-one-(2),
3-oximinohexanone-(2),
2-oximino-5-methyl-hexanone-(3),
2-oximinoheptanone-(3),
3-oximinoheptanone-(4),
3-oximino-octanone-(2),
4-oximino-nonanone-(5),
3-oximino-undecanone-(2),
3-oximinotridecanone-(2),
oximinoacetophenone,
p-fluoro-, p-chloro- and p-bromo-oximino-acetophenone,
p-methyl- and p-methoxy-oximino-acetophenone,
2,4- and 3,4-dimethyl-oximino-acetophenone,
oximino-propiophenone,
p-fluoro-, p-chloro- and p-bromo-oximino-propiophenone,
p-methyl-, p-benzyl-, p-dimethylbenzyl-, p-ethyl- and p-*tert.*-butyl-oximino-propiophenone,
p-methoxy-, p-ethoxy- and p-phenoxy- oximino-propiophenone,
p-benzyloxy-oximino-propiophenone,
2,5-dimethyl-oximino-propiophenone,
p-phenyl-oximino-propiophenone 2-oximino-1,3-diphenyl-propanone-(1),
1-oximino-1-phenylacetone,
1-oximino-1-*o*-, -*m*-, and -*p*-tolylacetone,
1-oximino-1-*e*-, -*m*-, and -*p*-anisylacetone,
1-oximino-1-*o*-, -*m*- and *p*-chlorophenylacetone,
1-oximino-1-*m*- and -*p*-cyanophenylacetone,
1-oximino-1-*m*- and -*p*-carbethoxy- and -*p*-carbethoxy-phenyl-acetone,
1-oximino-1-*m*- and -*p*-methylsulphonylphenyl-acetone,
1-oximino-1,3-diphenyl-acetone,
oximino-butyrophenone,
γ-benzoyl-γ-oximino-butyric acid methyl- and ethyl ester,
oximino-valerophenone,
oximino-1- and -2-propionaphthone,
benzil-monoxime,
tolil-monoxime,
anisil-monoxime,
oximino-cyclopentanone,
oximino-cyclohexanone,
2-oximino-indanone-(1),
2-oximino-tetralone-(1).

Those coumarin compounds of the formula (I) in which $R_2$ may stand for a cyano, carboxyl, carboxylic acid ester or carboxylic acid amide group, and $R_1$, $R_3$ and $R_4$ have the same meaning as above, are advantageously prepared by triazolising compounds of the formula

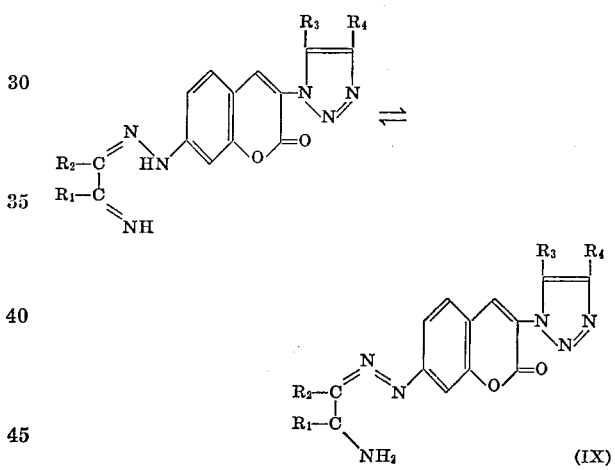
(IX)

in which $R_1$, $R_2$ and $R_3$ have the same meaning as above, by treatment with dehydrating agents.

A preferred method of carrying out this dehydration is characterised in that the compounds (IX) are first converted with the aid of copper(II) salts into the copper complexes, and these are then converted into the corresponding 7-triazolyl-coumarin compounds by heating in the presence of an excess of a solution of a complex copper(II) salt.

Furthermore, lead tetraacetate is also suitable as dehydrating agent, for example.

The coumarin compounds of the formula (IX) required as starting compounds can be obtained, for example, by diazotising 7-amino-coumarin derivatives of the formula

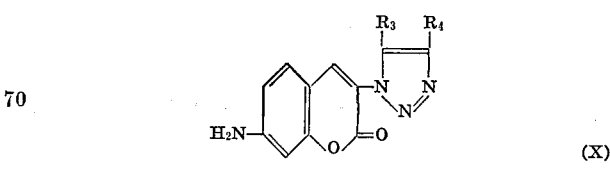
(X)

in which $R_3$ and $R_4$ have the same meaning as above, and coupling the diazo compound with enamines of the formula

in which $R_1$ and $R_2$ have the same meaning as above.

Those coumarin compounds of the formula (I) in which X stands for a methine group, are preferably obtained by condensing 7-hydrazino-coumarins of the formula

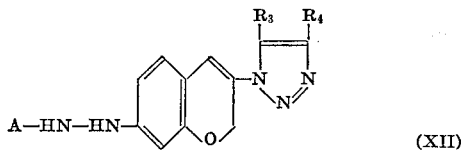

in which $R_3$ and $R_4$ have the same meaning as in formula (I), and A stands for hydrogen, an acyl radical or a sulphonic acid group, with vinyl-ketones of the formula

in which $R_1$ and $R_2$ have the same meaning as in formula (I), and Z stands for halogen, a hydroxyl, alkoxy, acyloxy or dialkyl-amino group, while maintaining the radical A, and subsequent cyclisation with the elimination of A—OH.

The condensation of β-halovinyl-ketones of the formula (XIII) (Z=halogen, e.g. Cl, Br) is preferably carried out with free 7-hydrazino-coumarin compounds [(XII); A=H], whereas β-hydroxy-, -alkoxy-, -acyloxy- or -dialkylamino-vinyl-ketones (XIII) are preferably condensed with 7-acyl-hydrazino-coumarin compounds [(XII); A=acyl].

The condensation of the hydrazino-coumarins of the formula (XII) with the vinyl-ketones of the formula (XIII) is expediently carried out in a neutral to weakly acidic organic medium at temperatures of about 40–100° C. The elimination of A—OH from the resultant reaction product is carried out by the reaction with strong acids, for example, mineral acids such as hydrochloric acid, at temperatures of about 80–120° C.

Suitable vinyl-ketones of the formula (XIII) are for example, phenyl-β-hydroxyvinyl-ketone,
hydroxymethylene-pinacoline,
p-tolyl- and p-anisyl-β-hydroxyvinyl-ketone,
p-fluoro-β-hydroxyvinyl-ketone,
phenyl-β-methoxyvinyl-ketone,
phenyl-(α-methyl-β-hydroxyvinyl)-ketone,
phenyl-(α-ethyl- and -propyl-β-hydroxyvinyl)-ketone,
phenyl-(α-isopropyl- and -benzyl-β-hydroxyvinyl)-ketone,
phenyl-(α-phenyl- and -tolyl-β-hydroxyvinyl-ketone,
p-biphenyl-β-hydroxyvinyl-ketone,
methyl-(α-methyl- and -ethyl-β-hydroxyvinyl)-ketone,
methyl-(α-phenyl- and -benzyl-β-hydroxyvinyl)-ketone,
ethyl-(α-methyl- and -phenyl-β-hydroxyvinyl)-ketone,
cyclohexyl-(α-phenyl-α-hydroxyvinyl)-ketone,
cyclohexyl-(β-phenyl-α-hydroxyvinyl)-ketone
benzyl-(α-phenyl-β-hydroxyvinyl)-ketone,
1,4-diphenyl-2-hydroxymethylene-butanone-(1),
2-hydroxy-methylene-cyclopentanone-(1) and -cyclohexanone-(1),
2-hydroxymethylene-indanone-(1),
2-hydroxymethylene tetralone-(1),
1-hydroxymethylene-tetralone-(2),
and their methyl ethers.

Suitable hydrazino-coumarins of the formula (XII), besides the free 7-hydrazino-aquarines, are for example, the formyl, acetyl and propionyl derivatives as well as the N-sulphonic acids of 3-[1,2,3-triazinyl-(1)]-7-hydrazino-coumarin,
3-[4-phenyl-v-triazinyl-(1)]-7-hydrazino-coumarin,
3-[4-ethyl-v-triazinyl-(1)]-7-hydrazino-coumarin,
3-[4-methoxy-v-triazinyl-(1)]-7-hydrazino-coumarin and
3-[4,5,6,7-tetrahydrobenzotriazolyl-(1)]-7-hydrazino-coumarin.

Those coumarin compounds of the formula (I) in which X stands for CH; $R_1$ stands for hydrogen; and $R_2$, $R_3$ and $R_4$ have the same meaning as above, are advantageously prepared by reacting the free 7-hydrazino compounds of the formula (XII) in which A stands for H, or their mineral acid salts, with malon-dialdehydes of the formula

in which Z′ stands for a hydroxyl, alkoxy, acyloxy or dialkylamino group, and $R_2$ has the same meaning as above, or with their functional derivatives.

This reaction is carried out, for example, by heating in glacial acetic acid to about 80–110° C.

The functional derivatives of malon-dialdehyde (XIV) and their functional derivatives include, for example, malon-dialdehyde, 1,1,3,3-tetramethoxy-propane, chloro-, and bromo-malon-dialdehyde and their bisulphite compounds, phenyl-malon-dialdehyde, α-phenyl-β-dimethylamino-acrolein, α-tolyl-β-dimethylamino-acrolein, cyano-malon-dialdehyde.

Obviously, the substituents of the new coumarin compounds of the formula (I) obtained according to one of the processes described above can be converted in known manner, subsequent to the full synthesis.

For example, sulphonic acid groups can be introduced into aryl radicals $R_1$ to $R_4$ by subsequent sulphonation, and any sulphonic acid groups present can be converted in known manner into sulphonamide and sulphonic acid ester groups.

Furthermore, cyano groups can be converted, for example, into carboxyl, carboxamide or carboxylic acid ester groups, and carboxyl groups can be esterified or amidised.

The quaternisation of the compounds of the formula (I) to form compounds of the formula (II) is carried out in known manner, for example, in an inert organic solvent. Suitable quaternising agents are, for example, the esters of strong mineral acids and organic sulphonic acids with preferably low-molecular alcohols, such as alkyl chlorides, alkyl bromides, alkyl iodides, aralkyl halides, alkylene halides, dialkyl sulphates; and esters of sulphonic acids of the benzene series, such as the methyl, ethyl, β-methoxyethyl, β-chloroethyl, propyl, n-butyl esters of benzenesulphonic acid, p-methylbenzene-sulphonic acid, p-chlorobenzene-sulphonic acid and p-nitrobenzene-sulphonic acid; as well as acrylonitrile in the presence of acids.

Suitable inert organic solvents are, for example, high-boiling aliphatic, cycloaliphatic or aromatic hydrocarbons; furthermore, stable aliphatic or cyclic halogen compounds, such as carbon tetrachloride, trichloroethylene, tetrachloroethylene, di-, tri- and tetrachloroethane, mono- or dichlorobenzene, nitrobenzene; as well as alcohols. It is also possible to work in an excess of liquid quaternising agent to obviate over-energetic reaction conditions.

The new triazolyl-coumarins of the formula (I) or (II) are valuable brightening agents. They are suitable for brightening fibres, filaments, fabrics, knitted fabrics, foils and plastic materials of synthetic origin, primarily for brightening materials of polyacrylonitrile, polyesters, polyamides, polyurethanes and cellulose esters. Compounds of the formula (I) which contain sulphonic acid groups can be used for brightening synthetic and natural polyamides.

The brightening agents of the present invention can be applied in the usual way, for example, in the form of solutions in water or organic solvents or in the form of aqueous dispersions. Polyester materials can also be treated with the brightening agents by impregnating them with solutions or dispersions of the brightening agents, followed by squeezing, drying and briefly heating at temperatures above 150° C. Furthermore, the brightening agents can be added to casting or spinning solutions serving for the production of synthetic fibres, filaments, foils and other shaped articles. The necessary amounts can easily be determined for every case; in general, amounts of 0.05 to 0.6%, referred to the material to be brightened, have proved sufficient.

The brightening agents according to the invention are extremely productive and are characterised by a high degree of whiteness; the resultant brightening effects are very fast to light and chlorine.

Coumarin compounds of the general formula (I) which contain one or more alkyl radicals with 4–12 carbon atoms are, in many cases, suitable for the optical brightening of synthetic fibre materials form organic solvents. The process is characterised in that the fibre materials are impregnated with dyeing liquors containing these brightening agents, and are subsequently subjected to a heat treatment.

EXAMPLE 1

(A) Preparation of 7-hydrazino-3-[v-triazolyl-(1)]-coumarin 228 g. 7-amino-3-[v-triazolyl-(1)]-coumarin (French Patent Specification No. 1,336,427) are stirred in 900 ml. of concentrated hydrochloric acid at 65° C. for 1 hour, and the resultant light-coloured crystal suspension is subsequently diazotised, after cooling to 0–5° C., with good stirring with a solution of 70 g. sodium nitrite in 250 ml. of water. The clear brown-red diazo solution so obtained is subsequently added dropwise with stirring to 1.4 litres of a concentrated technical sodium bisulphite solution, the temperature being kept within a range of 0–5° C. by external cooling with ice. The resultant yellow suspension is further stirred for 12 hours, first at 0° C., then at room temperature; the diazo reaction of a sample with H-acid is then negative. The precipitated yellow 7-hydrazino-3-triazolyl-coumarin-ω-sulphonic acid is filtered off with suction and the filter paste is stirred in 1 litre of concentrated hydrochloric acid at 65° C. for 3 hours. The complete elimination of the sulphonic acid group is tested by means of a thin layer chromatogram. After the addition of 1 litre of water and cooling to room temperature, the light-coloured crystal suspension is filtered off with suction and the resultant moist filter paste is again suspended in 1 litre of water. This suspension is mixed dropwise with stirring at room temperature with an aqueous ammonia solution until the pH value of 8 no longer changes. The resultant pale-yellow finely crystalline precipitate is filtered off with suction, washed with cold water until free from salt, and dried. There are obtained 196 g. of yellow 7-hydrazino-3-[v-triazolyl-(1)]-coumarin with a content of 94% (76% of theory); melting point 270–275° C. (decomposition).

(B) Preparation of 7-hydrazino-3-[4-phenyl-v-triazolyl-(1)]-coumarin 220 g. 4-phenyl-v-triazolyl-(1)-acetic acid are stirred with 254 g. 4-acetylamino-2-hydroxy-benzaldehyde-anil, 100 g. of anhydrous sodium acetate and 550 g. acetic anhydride at 145–150° C. for 15 hours. The mixture is subsequently allowed to cool down to 90° C., 450 ml. of concentrated hydrochloric acid are added dropwise at 90–100° C., and stirring is continued at 85° C. for 4 hours. The mixture is poured into 4 litres of water and neutralised with ammonia. The precipitated yellow crystalline 7-amino-3-[4-phenyl-v-triazolyl-(1)]-coumarin is filtered off with suction, washed with water until free from salt, and dried; melting point 302–304° C. (decomposition). 271 g. (89% of theory) are obtained. The amino-phenyl-triazolyl-coumarin so obtained is diazotised in concentrated hydrochloric acid in analogy with the amino-triazolyl-coumarin, as described under (A), and the diazo compound is reduced with a sodium hydrogen sulphite solution to form 7-hydrazino-3-[4-phenyl-v-triazolyl-(1)]-coumarin, which is obtained in the form of yellow crystals which decompose at about 273–277° C. Yield 201 g. (71% of theory), referred to amino-phenyl-triazolyl-coumarin.

In an analogous way there is obtained from 4-phenyl-5-methyl-v-triazolyl-(1)-acetic acid, 4-acetylamino-2-hydroxy-benzaldehyde-anil, sodium acetate and acetic anhydride, the 7-amino-3-[4-phenyl-5-methyl-v-triazolyl-(1)]-coumarin [pale, almost colourless crystals; melting point 271–272° C. (decomposition)] the diazo compound of which is reduced with sodium hydrogen sulphite, as described, to form 7-hydrazino-3-[4-phenyl-5-methyl-v-triazolyl-(1)]-coumarin; pale-yellow crystal powder, melting point 237–239° C. (decomposition).

The 7-amino-3-[4-methoxymethyl-, 4,5-dimethoxymethyl-, 4-methoxyvinyl- and 4,5-tetramethylene-v-triazolyl-(1)]-coumarins obtainable according to the methods described above from 4-methoxymethyl-v-triazolyl-(1)-acetonitrile, 4,5-dimethoxymethyl-v-triazolyl-(1)-acetonitrile, 4-(β-methoxyvinyl)-v-triazolyl-(1)-acetonitrile or 4,5,6,7-tetrahydrobenzo-triazolyl - (1) - acetonitrile and 4-acetylamino-2-hydroxybenzaldehyde-anil can likewise be converted into the corresponding hydrazines by reduction of their 7-diazo compounds.

(C) Preparation of 7-[4-ethyl-5-methyl-v-triazolyl-(2)]-3-[v-triazolyl-(1)]-coumarin (1c)

127 g. 7-hydrazino-3-[v-triazolyl-(1)]-coumarin are stirred with 63 g. 2-oximino-pentanone-(3) and 40 ml. of 50% acetic acid in 500 ml. glycol monomethyl ether at 92–95° C. for 4 hours. The reaction mixture is allowed to cool down to room temperature while stirring is continued, 250 ml. of water are added dropwise, and the precipitated yellow oximino-hydrazone is filtered off with suction. It is washed with a little cold methanol and dried at 80° C. under reduced pressure. 167 g. oximino-hydrazone are obtained in the form of an orange-yellow crystal powder of melting point 260–262° C. (decomposition).

167 g. of dry oximino-pentanone-triazolyl-coumarin-hydrazone are stirred with 55 g. acetic anhydride and 14 g. of anhydrous sodium acetate in 300 ml. dimethyl formamide. The mixture is heated to 100–105° C. within one hour, the same temperature is maintained for 3 hours, and stirring is continued at 120–125° C. for one hour. About 100–150 ml. are subsequently distilled off from the reaction mixture under reduced pressure, the mixture is allowed to cool down to room temperature, and the precipitated crystalline material is filtered off with suction. It is purified by reprecipitation from aqueous dimethyl formamide and subsequently from chlorobenzene, and there are thus obtained 115 g. of the desired triazolyl-coumarin in the form of white needles of melting point 207–208° C., which dissolve in dimethyl formamide to give a colourless solution of intense violet-blue fluorescence.

The 3-[v - triazolyl-(1)]-7-[v-triazolyl-(2)]-coumarins listed in the following table can be prepared in an analogous way from 7-hydrazino-3-[v-triazolyl-(1)]-coumarin or its derivatives substituted on the v-triazolyl-(1) ring and the specified oximino-ketones.

TABLE

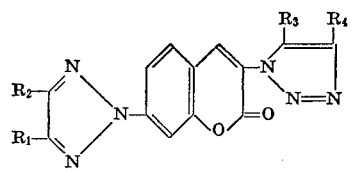

| No. | R₁ | R₂ | R₃ | R₄ | Oximino ketone | Shade of fluorescence in DMF (350 mμ) |
|---|---|---|---|---|---|---|
| 1-a | H | CH₃ | H | H | Oximino-acetone | Violet-blue. |
| 1-b | CH₃ | CH₃ | H | H | Diacetyl-monoxime | Do. |
| 1-c | C₂H₅ | CH₃ | H | H | 2-oximino-pentanone-(3) | Do. |
| 1-d | phenyl-CH₂ | CH₃ | H | H | 1-phenyl-2-oximino-butanone-(3). | Somewhat reddish blue. |
| 1-e | iso-C₃H₇ | CH₃ | H | H | 3-oximino-4-methyl-pentanone-(2). | Violet-blue. |
| 1-f | n-C₃H₇ | C₂H₅ | H | H | 3-oximino-heptanone-(4). | Do. |
| 1-g | CH₃ | n-C₁₀H₂₁ | H | H | 3-oximino-tridecanone-(2). | Do. |
| 1-h | —(CH₂)₄— | | H | H | 2-oximino-cyclohexanone-(1). | Do. |
| 1-i | (CH₃)₃C | H | H | H | 1-oximino-3,3-dimethyl-propanone-(2). | Do. |
| 1-k | phenyl | H | H | H | Oximino-acetophenone | Somewhat reddish blue. |
| 1-l | CH₃ | phenyl | H | H | 1-oximino-1-phenyl-acetone. | Do. |
| 1-m | phenyl | CH₃ | H | H | Oximino-propiophenone | Do. |
| 1-n | Same as above | C₂H₅ | H | H | Oximino-butyrophenone | Do. |
| 1-o | do | iso-C₃H₇ | H | H | Oximino-isovalerophenone. | Do. |
| 1-p | do | cyclohexyl | H | H | Cyclohexyl-oximino-benzylketone. | Reddish blue. |
| 1-q | do | phenyl | H | H | Benzil-monoxime | Do. |
| 1-r | CH₃—C₆H₄— | CH₃ | H | H | 4-methyl-oximino-propiophenone. | Do. |
| 1-s | F—C₆H₄— | H | H | H | 4-fluoro-oximino-acetophenone. | Do. |
| 1-t | Cl—C₆H₄— | CH₃ | H | H | 4-chloro-oximino-propiophenone. | Do. |
| 1-u | CH₃O—C₆H₄— | CH₃ | H | H | 4-methoxy-oximino-propiophenone. | Blue. |
| 1-v | C₆H₅—CH₂—C₆H₄— | CH₃ | H | H | 4-benzyl-oximino-propiophenone. | Somewhat reddish blue. |
| 1-w | CH₃ | m-NC—C₆H₄— | H | H | 1-oximino-1-m-cyano-phenylacetone. | Do. |
| 1-x | CH₃ | C₂H₅O—CO—C₆H₄— | H | H | 1-oximino-1-p-carbethoxyphenylacetone. | Blue. |
| 1-y | indanyl-CH₂— | | H | H | 2-oximino-indanone-(1) | Do. |
| 1-z | C₂H₅ | CH₃ | H | phenyl | 2-oximino-pentanone-(3). | Do. |
| a-1 | C₂H₅ | CH₃ | CH₃ | Same as above | do | Violet-Blue. |
| b-1 | C₂H₅ | CH₃ | H | —CH=CH—OCH₃ | do | Do. |
| c-1 | C₂H₅ | CH₃ | CH₂OCH₃ | CH₂OCH₃ | do | Do. |
| d-1 | C₂H₅ | CH₃ | H | CH₂OCH₃ | do | Do. |
| e-1 | C₂H₅ | CH₃ | —(CH₂)₄— | | do | Do. |

EXAMPLE 2

Preparation of 7-[4-methyl-5-carbethoxy-v-triazolyl-(2)]-3-[v-triazolyl-(1)]-coumarin (2a)

23 g. of 7 - amino-3-[v-triazolyl - (1)]-coumarin are stirred in the hot with 50 ml. of concentrated hydrochloric acid and 25 ml. of water. After cooling to +5° C. the light-coloured suspension is diazotised by the addition of a solution of 7 g. sodium nitrite in 30 ml. of water. The resultant diazo solution is poured into 500 ml. of ice-water and the excess of hydrochloric acid is buffered with sodium carbonate. The diazo suspension is then poured into a solution of 15 g. β-amino-crotonic acid ethyl ester in 200 ml. of alcohol, the pH value being kept at 5-6. When the coupling is completed, a dilute sodium chloride solution is added to the mixture, the precipitated orange-brown azo compound is filtered off with suction and dissolved in 250 ml. pyridine. 45 g. copper acetate are gradually added with stirring, and the mixture is heated at 75-80° C. As soon as the cyclisation is completed (about 3 hours), the pyridine is driven off with steam and the residue is purified by reprecipitation from toluene and dimethyl formamide. 14 g. of the coumarin derivative mentioned above are obtained in the form of pale yellowish needles which dissolve in dimethyl formamide with a violettish blue fluorescence.

The coumarin derivatives listed in the following table are obtained in an analogous way with the use of the specified coupling components.

perature are filtered off with suction, washed with methanol and recrystallized from chlorobenzene with the addition of bleaching earth. 116 g. 7-methylpyrazolyl-3-triazolyl-coumarin are so obtained in the form of greenish white needles which dissolve in dimethyl formamide with a violet-blue fluorescence (melting point 260° C.).

(B) Preparation of 7-[3-methyl-4-phenylpyrazolyl-(1)]-3-[v-triazolyl-(1)]-coumarin (2i)

25 g. 7 - hydrazino-3 - [v-triazolyl-(1)]-coumarin are stirred with 200 ml. glycol methyl ether, and 11 g. acetic anhydride are added at 40° C. The resultant solution is mixed with 17 g. α-phenyl-acetoacetoaldehyde (=hydroxy-methylene-benzy-methylketone) and stirred at 50° C. for 3 hours and at 70° C. for 1 hour. 15 ml. of concentrated hydrochloric acid are subsequently added dropwise, and the mixture is stirred at 65-70° C. for 1 hour and at 100-105° C. for 1 hour. After cooling, the precipitated pyrazolyl-coumarin is filtered off with suction, washed with methanol, and purified by recrystallisation from chlorobenzene. 12 g. methyl-phenyl-pyrazolyl-triazolyl-coumarin are so obtained in the form of greenish pale-yellow crystals which dissolve in dimethyl formamide with a somewhat reddish blue fluorescence.

(C) (Preparation of 7-[3-methyl-4-chloropyrazolyl-(1)]-3-[v-triazolyl-(1)]-coumarin (3t)

15 g. 7 - [3-methylpyrazolyl-(1)]-3-[v-triazolyl-(1)]-coumarin (3a) are dissolved in 400 ml. tetrachloroethane;

TABLE

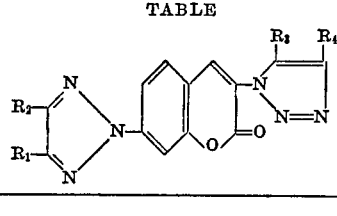

| No. | $R_1$ | $R_2$ | $R_3$ | $R_4$ | Coupling component | Shade of fluorescence in DMF (350 mμ) |
|---|---|---|---|---|---|---|
| 2-a | $CH_3$ | $COOC_2H_5$ | H | H | β-Amino-crotonic acid ethyl ester | Violet-blue. |
| 2-b | $CH_3$ | COOH | H | H | β-Amino-crotonic acid ethyl ester (subsequently hydrolysed) | Do. |
| 2-c | $CH_3$ | CN | H | H | β-Aminocrotonitrile | Do. |
| 2-d | ⟨phenyl⟩ | CN | H | H | β-Amino-cinnamic acid nitrile | Blue. |
| 2-e | Same as above | $CONH_2$ | H | H | β-Amino-cinnamic amide | Do. |
| 2-f | do | $COOC_2H_5$ | H | H | β-Amino-cinnamic acid ester | Do. |

EXAMPLE 3

(A) Preparation of 7-[3-methylpyrazolyl-(1)]-3-[v-triazolyl-(1)]-coumarin (3a)

127 g. 7-hydrazino-3 - [v-triazolyl-(1)]-coumarin are heated in 900 ml. glycol monomethyl ether with 75 g. 3-ketobutyr-aldehyde-dimethylacetal at 100° C. for 4 hours while stirring. After cooling to 60° C., 40 ml. of concentrated hydrochloric acid are added to the mixture and stirring is continued at 90-100° C. for 2 hours. The crystals which are precipitated after cooling to room temthe solution is mixed at 50° C. with 9 g. sulphuryl chloride. Stirring is continued at 50° C. for ½ hour and at 75° C. for ½ hour, the mixture is then allowed to cool down, and the precipitated crystalline product is filtered off with suction. It is purified by recrystallisation from dimethyl formamide and is then present in the form of greenish white crystals which dissolve in dimethyl formamide with a strong violet-blue fluorescence.

The compounds obtained according to this process with the specified carbonyl compounds are listed in the following table.

TABLE

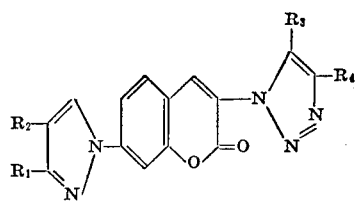

| No. | R₁ | R₂ | R₃ | R₄ | Carbonyl compound | Shade of fluorescence in DMF (350 mμ) |
|---|---|---|---|---|---|---|
| 3-a | CH₃ | H | H | H | β-Ketobutyraldehyde dimethyl-acetal. | Violet blue. |
| 3-b | H | H | H | H | 1,1,3,3-tetramethoxypropane (or malonic aldehyde). | Do. |
| 3-c | ⌬ | H | H | H | Phenyl-β-chlorovinyl-ketone. | Somewhat reddish blue. |
| 3-d | H | ⌬ | H | H | α-Phenyl-β-dimethyl-amino-acrolein. | Reddish blue. |
| 3-e | ⌬ | CH₃ | H | H | Hydroxymethylene-propiophenone. | Somewhat reddish blue. |
| 3-f | Same as above | C₂H₅ | H | H | Hydroxymethylene-butyrophenone. | Do. |
| 3-g | do | iso-C₃H₇ | H | H | Hydroxymethylene-isovalerophenone. | Do. |
| 3-h | ⌬H | ⌬ | H | H | Hydroxymethylene-benzylcyclohexyl-ketone. | Do. |
| 3-i | CH₃ | Same as above | H | H | Hydroxymethylene-benzyl-methyl-ketone | Do. |
| 3-k | CH₃ | ⌬—CH₂— | H | H | Methyl-(α-benzyl-β-hydroxy-vinyl)-ketone. | Violet-blue. |
| 3-l | ⌬—CH₂— | ⌬ | H | H | Hydroxymethylene-benzyl-benzyl-ketone. | Somewhat reddish blue. |
| 3-m | ⌬ | Same as above | H | H | Hydroxymethylene-desoxy-benzoin. | Blue. |
| 3-n | —(CH₂)₄— | | H | H | 2-hydroxymethylene-cyclo-hexanone-(1). | Violet-blue. |
| 3-o | C₂H₅ | ⌬ | H | H | Hydroxymethylene-benzyl-ethyl-ketone. | Somewhat reddish blue. |
| 3-p | H | Same as above | H | | Phenylmalone-dialdehyde. | Reddish blue. |
| 3-q | H | do | CH₃ | | do | Somewhat reddish blue. |
| 3-r | CH₃ | H | —(CH₂)₄— | | Ketobutyraldehyde-dimethyl-acetal. | Violet-blue. |
| 3-s | CH₃ | H | H | CH₂OCH₃ | do | Do. |
| 3-t | CH₃ | Cl | H | H | Ketobutyraldehyde-dimethyl-acetal; subsequently chlorinated. | Do. |
| 3-u | H | Br | H | H | Bromomalone-dialdehyde. | Do. |
| 3-v | H | Cl | H | H | Chloromalone-dialdehyde. | Do. |
| 3-w | CH₃ | H | CH₃ | ⌬ | Ketobutyraldehyde-dimethyl-acetal. | Somewhat reddish blue. |

EXAMPLE 4

Preparation of 7 - [4-ethyl-5-methyl-v-triazolyl-(2)]-3-[3-methyl-v-triazolium-(1)] - coumarin methosulphate or bromide 32 g. 7-[4-ethyl-5-methyl-v-triazolyl-(2)] - 3 - [v - tri-azolyl-(1)]-coumarin are boiled under a weak reflux in 150 ml. toluene with 13.5 g. dimethyl sulphate for 1 hour. The solvent is subsequently distilled off on a water bath under reduced pressure, and the light-coloured oily residue is mixed in the cold with a little petroleum ether. After standing, there crystallises the triazolium-coumarin methosulphate which is filtered off with suction, washed with a little petroleum ether, and dried at 50° C. in a vacuum drying cabinet. In this way it is obtained in the form of yellowish white crystals which readily dissolve in water with a greenish blue fluorescence.

The 7-[4-ethyl-5-methyl-v-triazolyl-(2)]-3-[3 - methyl-v-triazolium-(1)]-coumarin bromide can easily be precipitated from an aqueous solution of the methosulphate with the aid of potassium bromide; white crystals whose colourless aqueous solution has a greenish blue fluorescence.

From the 3-triazolyl-coumarins mentioned in Examples 1–3, the corresponding 3-triazolium-coumarin salts can easily be prepared in an analogous way with alkylating agents; the most important compounds are listed in the following table.

TABLE

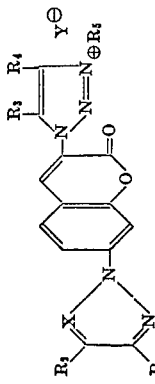

| No. | $R_1$ | $R_2$ | X | $R_3$ | $R_4$ | $R_5$ | Y | Compounds prepared from alkylating agents | Shade of fluorescence in water (350 mµ) |
|---|---|---|---|---|---|---|---|---|---|
| 4-a | H | $CH_3$ | N | H | H | $CH_3$ | $CH_3OSO_3-$ | Dimethylsulphate | Somewhat greenish blue. |
| 4-b | $C_2H_5$ | $CH_3$ | N | H | H | $CH_3$ | $CH_3OSO_3-$ | ......do......... | Do. |
| 4-c | $-CH_2-C_6H_5$ | $CH_3$ | N | H | H | $CH_3$ | $CH_3OSO_3-$ | ......do......... | Greenish blue. |
| 4-d | n-$C_3H_7$ | $C_2H_5$ | N | H | N | $C_2H_5$ | J- | n-butyl-iodide | Do. |
| 4-e | $C_2H_5$ | $CH_3$ | N | H | H | $CH_2-CH_2-OCH_3$ | $\bigcirc\!\!-\!\!SO_3-$ | Benzene-sulphonic acid-β-methoxy-ethyl ester. | Somewhat greenish blue. |
| 4-f | $C_2H_5$ | $CH_3$ | N | H | H | $C_2H_5$ | $C_2H_5OSO_3-$ | Diethylsulphate | Greenish blue. |
| 4-g | $C_2H_5$ | $CH_3$ | N | $CH_2OCH_3$ | $CH_2OCH_3$ | $CH_3$ | $CH_3OSO_3-$ | Dimethylsulphate | Blue. |
| 4-h | $C_2H_5$ | $CH_3$ | N | H | $-C_6H_4-CH_3$ | $CH_3$ | $CH_3OSO_3-$ | ......do......... | Greenish blue. |
| 4-i | $C_2H_5$ | $CH_3$ | N | H | H | $CH_3$ | Br- | Benzyl bromide | Do. |
| 4-k | $CH_3$ | CN | N | H | H | $CH_3$ | $CH_3OSO_3-$ | Dimethylsulphate | Somewhat greenish blue. |
| 4-l | $CH_3$ | H | CH | H | H | $CH_3$ | $CH_3OSO_3-$ | ......do......... | Do. |
| 4-m | $CH_3$ | H | CH | H | H | $CH_2-COOC_2H_5$ | Br- | Bromoacetic acid ethyl ester. | Do. |
| 4-n | $CH_3$ | H | CH | H | H | $CH_2-CH_2-OC_2H_5$ | $\bigcirc\!\!-\!\!SO_3-$ | Benzene-sulphonic acid-β-ethoxy-ethyl ester. | Do. |
| 4-o | $CH_3$ | H | CH | H | H | $CH_2-CH_2-CN$ | Cl- | Acrylonitrile plus HCl | Greenish blue. |
| 4-p | $CH_3$ | H | CH | H | H | $CH_2-CH_2-Cl$ | $\bigcirc\!\!-\!\!SO_3-$ | Toluene-sulphonic acid-β-chloroethyl ester. | Somewhat greenish blue. |
| 4-q | H | H | CH | H | $-(CH_2)_4-$ | $CH_3$ | $CH_3OSO_3-$ | Dimethylsulphate | Greenish blue. |
| 4-r | $-C_6H_4-CH_3$ | H | CH | H | $-C_6H_4-CH_3$ | $CH_3$ | $CH_3OSO_3-$ | ......do......... | Do. |
| 4-s | $CH_3$ | Cl | CH | H | H | $CH_3$ | $CH_3OSO_3-$ | ......do......... | Somewhat greenish blue. |
| 4-t | $CH_3$ | H | CH | H | H | $CH_3$ | $CH_3OSO_3-$ | ......do......... | Do. |
| 4-u | $CH_3$ | H | CH | $CH_3$ | H | $CH_3$ | $CH_3OSO_3-$ | ......do......... | Blue. |
| 4-v | $CH_3$ | H | CH | H | H | $C_2H_5$ | Br- | Allyl bromide | Somewhat greenish blue. |
| 4-w | $CH_3$ | H | CH | H | H | $CH_2-CN$ | Cl- | Chloroacetonitrile | Do. |
| 4-x | $CH_3$ | H | CH | H | H | $CH_2-CH_2-OH$ | $CH_3COO-$ | Ethylene-oxide plus acetic acid | Do. |

EXAMPLE 5

Fibres of polyethylene glycol terephthalate are introduced in a liquor ratio of 1:40 into a bath containing, per litre, 1 g. oleyl sulphonate, 0.75 g. formic acid and 0.1 g. of one of the compounds mentioned in Examples 1a–1f and 3a–d. The bath is subsequently heated to boiling temperature and the same temperature is maintained for 30–60 minutes. After rinsing and drying, the polyester fibres exhibit a very good brightening effect of high fastness to washing, chlorine and light.

EXAMPLE 6

A yarn of polyethylene glycol terephthalate is agitated in a liquor ratio of 1:40 in a roller bath at 125° C. for 45 minutes in a liquor containing, per litre, 1 g. oleyl sulphonate, 0.75 g. formic acid and 0.1 g. of one of the compounds mentioned in Examples 1 to 3. After rinsing and drying, the polyester yarn exhibits a good degree of whiteness of high fastness to washing, chlorine and light.

EXAMPLE 7

A fabric of polyester fibres is padded with an aqueous liquor containing, per litre, 1 g. of a commercial dispersing agent based on fatty alcohol polyglycol ethers, 1 g. of a commercial wetting agent based on alkyl-naphthalene-sulphonic acids, 4 g. of an alginate thickening agent, as well as a solution of 1 g. of one of the compounds mentioned in Examples 1 to 3, in 20 g. triethanolamine. The fabric is then squeezed to a weight increase of 100%, then dried, heated at 190° C. for 1 minute, and subsequently washed hot. Compared with untreated fabric, it exhibits a very strong and clear brightening effect of excellent fastness to light, washing and chlorite.

EXAMPLE 8

6 kg. terephthalic acid dimethyl ester and 5 litres ethylene glycol are mixed in a stirrer autoclave with 0.05% zinc acetate and 0.03% (referred to terephthalic acid methyl ester) of one of the compounds described in Examples 1d, q, v, y and z. The autoclave is heated to 180° C. while stirring; transesterification starts at about 150° C. The eliminated methanol is distilled off. The temperature is raised to 200° C. after one hour and to 220° C. after a further 45 minutes. The transesterification is then completed. For precondensation, the product so obtained is pressed under nitrogen into an autoclave heated to 275° C. During precondensation, the excess of glycol is distilled off. After 45 minutes, a vacuum is applied, which is weak at first and is increased to below 1 mm. Hg in the course of a further 45 minutes. After about 2½ hours, the polycondensation is completed and the resultant melt is subsequently extruded to produce filaments with a final titre of 50–25. The filaments so obtained exhibit an outstanding brightening effect of high fastness to light and wet processing.

EXAMPLE 9

Polyacrylonitrile fibres are introduced in a liquor ratio of 1:40 into an aqueous bath containing, per litre, 1 g. oxalic acid, 1 g. sodium chlorite, as well as 0.05 g. of one of the compounds mentioned in Example 4. The bath is heated to boiling temperature within 20 minutes and the same temperature is maintained for 45–60 minutes. The polyacrylonitrile fibres are subsequently rinsed and dried. The fibres then exhibit an outstanding brightening effect.

EXAMPLE 10

One of the compounds mentioned in Example 4 is added to a conventional polyacrylonitrile spinning solution in such a quantity that the concentration of this compound in the polyacrylonitrile component of the extruded fibre amounts to 0.1 percent by weight. The spinning solution is spun in the usual way and the fibre material so produced is agitated for 45 minutes in a liquor ratio of 1:40 in an aqueous bath at 95° C., which contains, per litre, 1 g. sodium chlorite and 1 g. oxalic acid. The fibres so obtained are pure white.

EXAMPLE 11

A yarn of polyamide 6 is treated in a liquor ratio of 1:40 at 80–90° C. for 30 minutes in an aqueous bath containing, per litre, 0.15 g. of the brightening agent of the formula

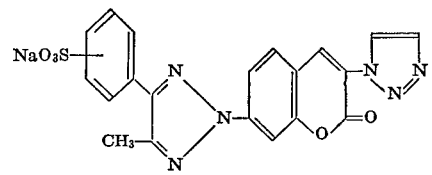

and 2 g. sodium chlorite. After rinsing and drying, the yarn exhibits a very clear brightening effect.

The brightening agent used above was prepared as follows: 10 g. 3-[v-triazolyl-(1)]-7-[4-phenyl-5-methyl-v-triazolyl-(2)]-coumarin (Example 1m) are heated in 70 ml. of concentrated sulphuric acid at 115° C. for 2 hours while stirring. After cooling, the mixture is poured into 400 ml. of cold water, sodium chloride is added until the precipitation is complete, and the precipitated sulphonic acid is filtered off with suction. The filter residue is stirred in 500 ml. of hot water and neutralised with a sodium hydroxide solution. The hot solution is clarified with the use of adsorption charcoal, and the sulphonic acid salt is salted out by the addition of sodium chloride. The precipitated product is filtered off with suction, washed with a 5% sodium chloride solution, and dried. The sodium salt of 3-[v-triazolyl-(1)]-7-[3-sulphophenyl-5-methyl-v-triazolyl-(2)]-coumarin is obtained in the form of a light-coloured greenish crystal powder whose colourless solution in dimethyl formamide has a strong blue (reddish) fluorescence in ultraviolet light.

EXAMPLE 12

A fabric of cellulose acetate fibres is introduced in a liquor ratio of 1:40 into a bath containing, per litre, 1 g. oleyl sulphonate, 0.75 g. formic acid, and 0.08 g. of one of the brightening agents mentioned in Example 1 under c to i. The bath is then heated to 60° C. within 20 minutes and the same temperature is maintained for 30–60 minutes. After rinsing and drying, the fabric exhibits a brilliant brightening effect.

We claim:

1. Coumarin compound of the formula

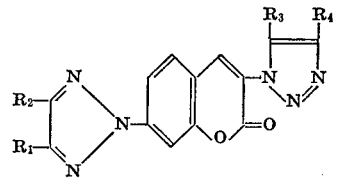

wherein $R_1$ and $R_2$ are H; $CH_3$; $C_2H_5$; $C_3H_7$; $C_4H_9$; $C_5H_{11}$; COOH; $CONH_2$; $C_8H_{17}$; $C_{10}H_{21}$; $C_3H_6=CH-$; $C_2H_4COOC_2H_5$; $C_2H_4COOCH_3$; $C_2H_4OH$; benzyl; CN, $COOC_2H_5$; cyclohexyl; styryl; naphthyl; phenyl; phenyl substituted by Cl, Br, F, $CH_3$, $C_2H_5$, $C_4H_9$, $OCH_3$, $OC_2H_5$, benzyl, benzyloxy, dimethylbenzyl, phenyl, phenyloxy, cyano, $SO_2CH_3$, $COOC_2H_5$, $SO_3H$; or $R_1$ and $R_2$ together form a radical $-(CH_2)_3-$, $-(CH_2)_4-$,

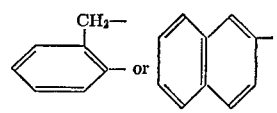

and wherein $R_3$ and $R_4$ are H, $CH_3$, $CH_2OH$, $CH_2OCH_3$, phenyl, or $-CH=CH-OCH_3$ and $R_3$ and $R_4$ together are a radical —(CH$_2$)—$_4$, and their quaternization products of the formula

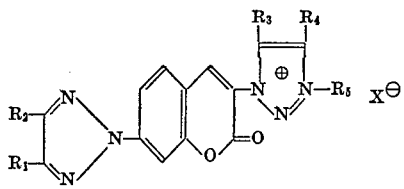

wherein R$_5$ is C$_{1-4}$ alkyl, chloroethyl, methoxy ethyl carbomethoxy methyl, ethoxy ethyl, cyanoethyl, cyanomethyl hydroxyethyl, or benzyl; and Y is a colorless anion.

2. Coumarin compounds of the formula

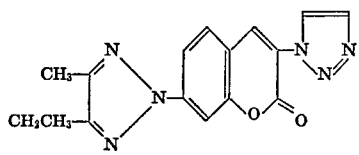

3.

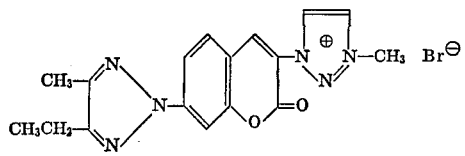

References Cited
UNITED STATES PATENTS

| | | | |
|---|---|---|---|
| 3,646,052 | 2/1972 | Neuner et al. | 260—308 A |
| 3,521,187 | 7/1970 | Snavely et al. | 260—308 R |
| 3,663,560 | 5/1972 | Schellhammer et al. | 260—308 R |
| 3,271,412 | 9/1966 | Raue et al. | 260—308 B |

JOSEPH A. NARCAVAGE, Primary Examiner

U.S. Cl. X.R.

260—308 B, 37 R; 8—57